May 22, 1956
J. R. WELLS
2,746,356
ADJUSTABLE REARVIEW MIRROR
Filed June 15, 1953
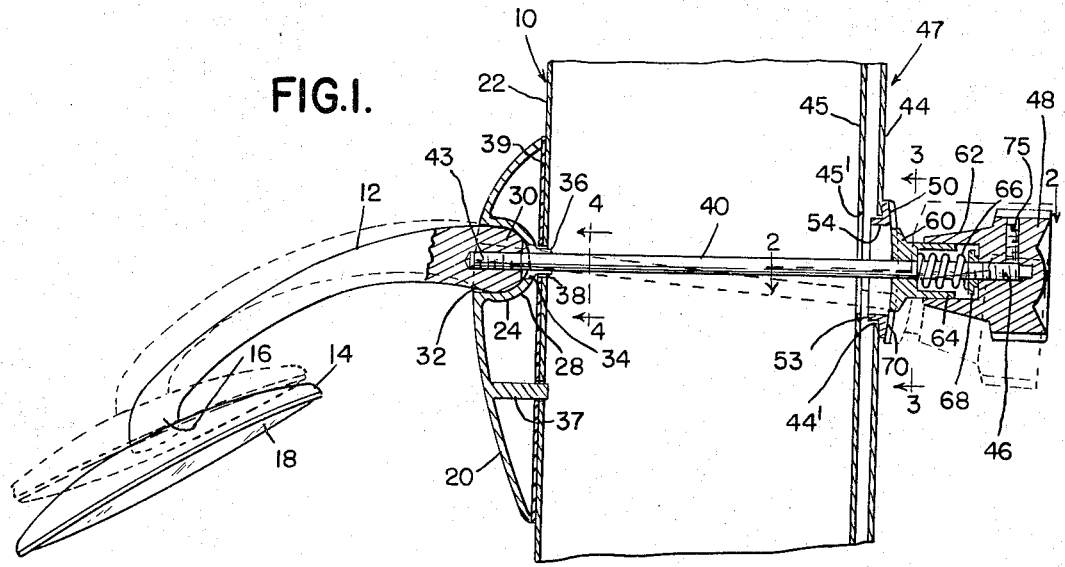
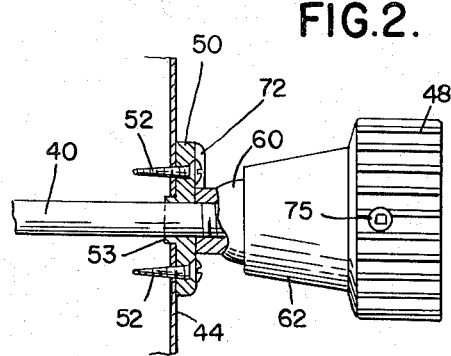
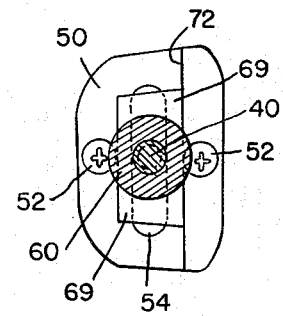
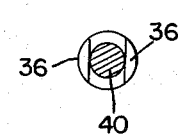
INVENTOR.
JOHN R. WELLS
BY
Whittemore, Hulbert & Belknap
ATTORNEYS

United States Patent Office 2,746,356
Patented May 22, 1956

2,746,356

ADJUSTABLE REARVIEW MIRROR

John R. Wells, Detroit, Mich.

Application June 15, 1953, Serial No. 361,450

5 Claims. (Cl. 88—93)

This invention relates to adjustable rear-view mirrors, and more particularly to rear-view mirrors designed to be mounted on the outer side of an automobile door.

One object of this invention is to provide a rear-view mirror for automobiles which is universally adjustable and which has means within the automobile for accomplishing the adjustment.

Another object of the invention is to provide means for retaining the mirror at the desired position of adjustment by mechanism located entirely within the automobile.

Adjustable mirrors mounted on the outer side of a vehicle are often provided with a friction-type mounting to maintain the desired mirror setting. However, strong winds at high speeds tend to disturb the mirror setting. It is therefore a further object of the invention to provide means entirely within the vehicle for conveniently adjusting the strength of the friction-type mounting.

Other objects of the invention will become more apparent as the following description proceeds, especially when taken in connection with the accompanying drawing, wherein:

Figure 1 is a view, partly in section, of a rear view mirror assembly constructed in accordance with my invention and shown mounted on an automobile door;

Figure 2 is a partial sectional view taken along the line 2—2 on Figure 1;

Figure 3 is a sectional view taken along the line 3—3 on Figure 1; and

Figure 4 is a sectional view taken along the line 4—4 on Figure 1.

Referring now more particularly to the drawing and especially to Figure 1 thereof, the mirror assembly will be seen to be mounted on one of the vehicle doors 10, ordinarily the one next to the driver's seat. The mirror assembly comprises a mirror supporting arm 12 on the outer side of the door, having a mirror frame 14 rigidly secured to the outer end of the arm as at 16, said frame rigidly supporting a mirror 18 therein. It will thus be seen that the mirror 18 is fixedly positioned with respect to the arm 12. It will, of course, be understood that the mirror and frame may be otherwise secured to arm 12, if desired, as by a swivel connection.

A socket block or support 20 is provided for supporting the arm 12 for limited swivel movement, being rigidly secured on the outer side of the outer door panel 22 in a manner hereinafter more fully described. The socket block bulges outwardly as shown and is formed with a socket 24 which is open at the outer side of the socket block to receive the inner end of arm 12. The bottom portion 28 of the socket is spherically-shaped to receive the similarly shaped end portion 30 of arm 12, thereby providing for full rotative movement of the arm and rocking movement thereof within a range determined by the size of the mouth 32 of the socket. It is not necessary that the end portion 30 be a complete sphere to permit the above described movement but may be flattened on one side as shown.

The bottom of the socket 24 is apertured as shown at 34 and has laterally opposed projections 36 which project through an aperture 38 in the outer door panel 22. These projections serve to locate the socket block against shifting movement and also to guide the path of rocking movement of the mirror supporting arm, as seen in Figure 4. A pin 37 which may be formed integrally with the socket block projects through an opening in the outer door panel to prevent rotation of the socket block. A gasket 39 may desirably be interposed between the socket block and outer door panel.

The position of the mirror-supporting arm relative to socket block 20 is controlled by suitable mechanism accessible within the automobile. This mechanism includes a rod 40, one end of which threadedly engages the ball shaped end portion 30 of arm 12 and extends from that point through the passage 34 terminating at a point within the automobile. The threaded connection 43 between the outer end of rod 40 and the ball-shaped end portion of arm 12 is tightened to such a degree as to prevent loosening thereof which might otherwise result from twisting action imposed upon the rod from within the automobile. Obviously, means other than the threaded connection 43 may be provided to effect the connection between arm 12 and rod 40.

Rod 40 may be considered an extension of arm 12 and the arm 12 together with rod 40 constitute an elongated member for supporting the mirror.

Provision is made for drawing the ball-shaped portion 30 of arm 12 into rather tight frictional engagement with socket 24 in order to maintain the setting of arm 12 in position with the mirror 18 at the desired angle. The inner end of the rod 40 projects through the inner door panel 47 and terminates within the vehicle. More specifically, the inner door panel comprises an inner panel portion 45 and a garnish moulding 44. Rod 40 projects through openings 45' and 44' respectively in the inner panel portion 45 and garnish moulding 44, and has a threaded end portion 46. The threaded portion 46 will preferably be longer than ordinarily necessary so that the mirror assembly may be mounted on doors of various thicknesses by merely cutting off the threaded portion 46 to suit the particular door thickness.

Threaded on the inner end 46 of rod 40 is an abutment in the form of a control knob 48 for manipulating the mirror assembly.

A guide block 50 is secured to the inner side of garnish moulding 44 by screws 52. Guide block 50 has a tubular extension 53 projecting into opening 44' and defines a slot 54 through which the inner end of rod 40 extends, and this slot is elongated as shown to determine the extent of rocking movement permitted of arm 12 and is of a width approximating the diameter of rod 40 to confine the path of rocking movement.

It will be noted that the dimensions of passage 34 and projections 36 are sufficient to accommodate the rocking movement permitted by guide block 50.

A sliding member 60 is sleeved on rod 40 between knob 48 and guide block 50. The knob 48 is formed with a tubular extension 62, the inner surface of which is spaced from rod 40 to define an annular space. The tubular extension 62 of knob 48 receives a similar tubular extension 64 on the inner end of member 60. Encircling rod 40 within the tubular extensions 62 and 64 is a coiled spring 66 bearing at one end against the bottom of tubular extension 64 and at the other end against a thrust washer 68 interposed between the inner end of the spring and the bottom of tubular extension 62 of the control knob.

It will be seen that the opposite end of sliding member 60 is formed with a pair of laterally extending flanges 69 which have arcuate faces engageable with the similarly formed face 70 on guide block 50. It will be noted that the face 70 of guide block 50 is curved on a radius whose center coincides with the axis of rocking movement of arm 12 and that guide block 50 has a shoulder 72 which engages the flanges 69 of the sliding member during rocking of arm 12.

Spring 66 is compressed between the knob and sliding member and thus the sliding member is urged away from the knob, causing the arcuate surfaces of the sliding member to be pressed against the arcuate face 70 of the guide block, thereby frictionally resisting rocking movement of the mirror assembly relative to the guide block. In addition, the spring 66 urges the knob to the right as viewed in Figure 1 and thus tends to draw ball 30 into socket 24 to increase the frictional contact of the ball and socket connection, thereby resisting both rotation and rocking movement of the arm 12. The action of spring 66 urging ball 30 into socket 24 of the socket block is also relied upon the maintain the latter in assembled relation to the door.

The knob may be adjusted longitudinally of rod 40 by reason of the threaded connection with rod 40 to vary the degree of compression of the spring and thereby to vary the frictional forces which tend to resist rotation and rocking movement of arm 12. The knob may be releasably locked in selected positions of longitudinal adjustment by means of the set screw 75 which threadedly engages in the tapped transverse hole in the knob, the inner end of the set screw being adapted to bear against the threads on rod 40 in locked position.

The knob and set screw being located on the inner side of the door, adjustment of the compression of spring 66 may be readily and easily accomplished to suit the needs of the driver. The mirror assembly may be readily mounted on the door of an automobile. There is no danger of the spring and associated parts for maintaining the mirror adjustment, dropping between the door panels during assembly since these parts are all located on the inner side of the door.

While the mirror assembly thus described is shown mounted on a vehicle body door, it will be understood that the same may be mounted on other structures with equal advantage. The tendency in current auto design is toward a wrap-around front window construction, and the mirror assembly may be mounted below this part of the vehicle body adjacent the front edge of a front door if desired. In this way the guide block 50 would fasten to the instrument panel.

The drawing and foregoing specification constitute a description of my invention in such full, clear, concise and exact terms as to enable any person skilled in the art to practice the invention, the scope of which is indicated by the appended claims.

What I claim as my invention is:

1. The combination with a vehicle body wall having spaced inner and outer panels, of a mounting including an arm for supporting a mirror or the like, means on said other panel having a supporting portion for said arm, said arm and supporting portion having a socket on the one and a part on the other received in said socket to provide a swivel connection permitting rotation and rocking movement of said arm relative to said supporting portion, said arm having an extension projecting through a passage in said supporting portion and through said inner and outer panels, said inner and outer panels having openings for accommodating said extension, a guide block secured to said inner panel and having an elongated slot receiving and engaging said extension to closely confine the path of rocking movement of said extension and arm in a single plane, and mechanism entirely at the inner side of said inner panel constituting the sole means for drawing said part into said socket to frictionally resist rotation and rocking movement of said extension and arm, said mechanism comprising an abutment on said extension at the inner side of said inner panel and spring means compressed between said abutment and guide block frictionally engaging the latter.

2. The structure set forth in claim 1, said abutment being adjustable longitudinally of said extension to vary the amount of compression on said spring means, and means for releasably locking said abutment in selected positions of longitudinal adjustment.

3. The structure set forth in claim 1, said abutment comprising an operating knob on the inner end of said extension, said spring means comprising an element slidably mounted on said extension adjacent said guide block, and a coil spring encircling said extension and having its ends compressed between said knob and element and urging the latter into frictional contact with said guide block.

4. The structure set forth in claim 1, said abutment comprising an operating knob threaded on the inner end of said extension for longitudinal adjustment relative to the latter to vary the mount of compression on said spring means, said spring means comprising an element slidably mounted on said extension adjacent said guide block, a coil spring encircling said extension and having its ends compressed between said knob and element and urging the latter into frictional contact with said guide block, and means for releasably locking said knob in selected positions of longitudinal adjustment.

5. The structure set forth in claim 4, said locking means comprising a set screw carried by said knob and engageable with said extension.

References Cited in the file of this patent

UNITED STATES PATENTS

| | | |
|---|---|---|
| 1,494,821 | Stearns | May 20, 1924 |
| 1,612,960 | Anderson | Jan. 4, 1927 |
| 1,619,936 | Howe | Mar. 8, 1927 |
| 2,281,234 | Clark et al. | Apr. 28, 1942 |
| 2,341,208 | Clark et al. | Feb. 8, 1944 |
| 2,483,289 | Martin | Sept. 27, 1949 |
| 2,585,308 | Goldstein | Feb. 12, 1952 |
| 2,620,708 | Anderson | Dec. 9, 1952 |
| 2,644,363 | Capitani | July 7, 1953 |